US005812653A

United States Patent [19]
Jodoin et al.

[11] Patent Number: 5,812,653
[45] Date of Patent: Sep. 22, 1998

[54] SUBSCRIPTION AND PAIRED AUTHORIZATION CODE BASED ACCESS TO A MEET-ME CONFERENCING SERVICE

[75] Inventors: Sylvain Jodoin, Montreal; Joanne Pilkington, St-Bruno; Pierre Belzile, Lachine; Charles Meubus, Westmount, all of Canada

[73] Assignee: Northern Telecom Limited, Montreal, Canada

[21] Appl. No.: 723,081

[22] Filed: Sep. 30, 1996

Related U.S. Application Data

[60] Provisional application No. 60/009,224 Dec. 26, 1995.
[51] Int. Cl.$^6$ ..................................................... H04M 3/56
[52] U.S. Cl. ........................ 379/205; 379/202; 379/204; 379/207; 370/260; 370/261
[58] Field of Search ..................................... 379/202, 203, 379/204, 205, 206, 207, 188, 196, 197, 198, 219, 220, 221, 242, 243, 93.02, 93.03, 93.04; 370/260, 261, 262

[56] References Cited

U.S. PATENT DOCUMENTS

| | | | |
|---|---|---|---|
| 4,509,167 | 4/1985 | Bantel et al. | 370/261 |
| 4,540,850 | 9/1985 | Herr et al. | 370/261 |
| 4,550,224 | 10/1985 | Winchell | 370/261 |
| 4,577,065 | 3/1986 | Frey et al. | 379/204 |
| 4,635,251 | 1/1987 | Stanley et al. | 370/261 |
| 4,796,293 | 1/1989 | Blinken et al. | 379/202 |
| 5,099,510 | 3/1992 | Blinken, Jr. et al. | 379/202 |
| 5,379,280 | 1/1995 | Cotton et al. | 370/268 |
| 5,408,518 | 4/1995 | Yunoki | 379/67 |
| 5,408,526 | 4/1995 | McFarland et al. | 379/202 |
| 5,440,563 | 8/1995 | Isidoro et al. | 370/270 |
| 5,483,587 | 1/1996 | Hogan et al. | 379/202 |
| 5,526,413 | 6/1996 | Cheston, III et al. | 379/207 |
| 5,546,449 | 8/1996 | Hogan et al. | 379/202 |
| 5,619,555 | 4/1997 | Fenton et al. | 379/202 |
| 5,638,434 | 6/1997 | Gottlieb et al. | 370/260 |
| 5,642,156 | 6/1997 | Saiki | 379/202 |

*Primary Examiner*—Krista Zele
*Assistant Examiner*—Scott Wolinsky
*Attorney, Agent, or Firm*—John A. Granchelli; Dallas F. Smith

[57] ABSTRACT

The invention manifests a secure, on-demand meet-me conferencing service embodied within a telephone network having an advanced intelligent network (AIN) infrastructure. Centralized control of conferencing bridges located in network switches is effected at a service control point (SCP) in the AIN telephone network. Users of the service first subscribe to it, and are assigned a primary authorization code, a code assignment directory number (DN) and a conference DN at that time. Before a conference, a subscriber calls the code assignment DN, provides the primary authorization code, and receives a secondary authorization code for distribution to persons who will be participants of the conference call. At the time of the conference, the subscriber dials the conference DN and provides the primary authorization code to the conferencing service to initiate the conference call. The participants then dial the conference DN and use the secondary authorization code to access the conference.

32 Claims, 2 Drawing Sheets

SUBSCRIPTION AND PAIRED AUTHORIZATION CODE BASED ACCESS TO A MEET-ME CONFERENCING SERVICE

This application claims the benefit of U.S. Provisional Application No. 60/009,224, filed Dec. 26, 1995.

RELATED APPLICATIONS

This application is related to copending U.S. patent application Ser. No. 08/723,080, entitled "CENTRALIZED MANAGEMENT AND ALLOCATION OF BRIDGES IN A TELECOMMUNICATIONS NETWORK FOR A MEET-ME CONFERENCING SERVICE", which was filed concurrently herewith on Sep. 30, 1996 and is incorporated herein by reference.

BACKGROUND OF THE INVENTION

The present invention relates generally to telephony conferencing services and, in particular, to a secure, on-demand, meet-me conferencing service based on an advanced intelligent network (AIN) infrastructure.

Prior art telephony conferencing systems have been either switch-based or centralized in conference nodes. With switch-based systems, conferencing bridges are local to the switch and are available for use only to the community served by the switch. For a fixed grade of service, these implementations suffer from lower efficiency in the use of conferencing bridges than can be achieved by pooling of resources across the network. In case of centralized conference nodes, audio conferencing bridges are centrally located and serve a multiplicity of switches. The main drawback of the centralized conference nodes is that it leads to trunking inefficiency. Accordingly, conference services are relatively expensive and require facility reservation in advance of the conference, which constitutes an impediment to their use.

SUMMARY OF THE INVENTION

It is an object of the present invention to provide a new and improved conferencing service.

The invention, therefore, according to a first broad aspect provides in respect of a telecommunications network including a plurality of switching systems, one or more of which having one or more conference bridges, a method of accessing a conferencing service to effect a conference, comprising the steps of: maintaining subscription information including predetermined primary authorization codes associated with respective subscribers; receiving, from a first call, an input subscriber identification; providing, responsive to correlating the input subscriber identification to a particular subscriber identified from the maintained subscription information, a secondary authorization code to the first call; maintaining an association pairing the primary authorization code of the particular subscriber with the secondary authorization code; receiving, from a second call, an input primary code; selecting an available bridge from the one or more bridges; maintaining, responsive to correlating the input primary code to the primary authorization code of the particular subscriber, an association between the selected bridge and the particular subscriber; connecting the second call through the network to the selected bridge whereby the second call initiates a conference; receiving, from a third call, an input secondary code; and connecting, responsive to correlating the input secondary code to the secondary authorization code paired with the primary authorization code of the particular subscriber, the third call through the network to the selected bridge whereby the third call joins the initiated conference.

In accordance with a second broad aspect of the invention, there is provided in respect of a telecommunications network including a plurality of switching systems, one or more of which having one or more conference bridges, a system for effecting a conferencing service, comprising: means for maintaining subscription information including predetermined primary authorization codes associated with respective subscribers; means for receiving, from a first call, an input subscriber identification; means for providing, responsive to correlating the input subscriber identification to a particular subscriber identified from the maintained subscription information, a secondary authorization code to the first call; means for maintaining an association pairing the primary authorization code of the particular subscriber with the secondary authorization code; means for receiving, from a second call, an input primary code; means for selecting an available bridge from the one or more bridges; means for maintaining, responsive to correlating the input primary code to the primary authorization of the particular subscriber, an association between the selected bridge and the particular subscriber; means for connecting the second call through the network to the selected bridge whereby the second call initiates a conference; means for receiving, from a third call, an input secondary code; and means for connecting, responsive to correlating the input secondary code to the secondary authorization code paired with the primary authorization code of the particular subscriber, the third call through the network to the selected bridge whereby the third call joins the initiated conference.

The invention, as a particular embodiment, manifests a secure, on-demand meet-me conferencing service that may be implemented within a telecommunications network having an advanced intelligent network (AIN) infrastructure. Centralized management and allocation of provisioned conferencing bridges located in network switches is effected at a service control point in the AIN, thereby overcoming the resource efficiency limitations and corresponding costs of the prior art systems. In addition, it enables a local exchange carrier (LEC) to offer a new type of telephony conferencing service at a lower cost where prior reservation of conferencing facilities is no longer necessary and which possesses other advantages with respect to ease of use, ease of administration, availability and security.

The AIN infrastructure may be characterized as a telecommunication network (i.e., public switched telephone network or PSTN) comprising a signaling system 7 (SS7) signaling network which may connect service switching points (SSPs) equipped with an AIN call model, signal transfer points (STPs) and service control points (SCPs) together through an SSP-SCP TCAP-based AIN signaling. The SSP AIN call model and SSP-SCP AIN signaling refer to Bellcore AIN 0.1 and following releases. A conferencing bridge is a well known hardware element that permits multiple users to conference telephone calls, and associated with each bridge are two predetermined directory numbers (DNs) whereby calls to either are routed by the telecommunications network to the corresponding bridge. One of the two DNs (i.e., chairperson DN) enables a call connected thereto to initiate a conference at the corresponding bridge and the other DN (i.e., participant DN) enables calls connected thereto to join the initiated conference at that bridge. A chairperson may be a valid end-user who initiates a conference, and a participant or conferee may be any valid end-user who dials in a living conference initiated by the chairperson.

Other advantages of the conferencing service include that all valid end-users may initiate a conference at any time, prior reservation of a bridge not being necessary. The bridges available within the network are centrally managed and allocated thereby offering practically unlimited conferencing service in respect of users and duration. The service also provides security, confidentiality, billing flexibility, and is may be used by various types of end-users. Furthermore, the method of the present invention provides much latitude in the ways a local exchange carrier may configure its particular conferencing service.

To initiate a conference, a valid end-user only needs to dial the directory number to access the conferencing service, and identify himself or herself. After validation, the end-user is connected to a conferencing bridge. The end-user becomes the chairperson of the conference.

Due to the dynamic conferencing bridge allocation mechanism, introduced by the invention, the service does not need to know in advance which bridge would be used for a given conference. Consequently, there is no need to control conference duration and limit conferencing bridge usage. The conferencing bridges are used on a first come, first served basis. The LEC needs not to impose any limit on the participants of the conference, for which size is only dependent upon the conferencing bridges' capability and port availability.

All conferencees (i.e., the chairperson and participants) are ensured complete confidentiality and security. Only valid and authorized conferees are allowed access to the conference. The service allows for various ways to access a conference, for example, by having end-users subscribe to the service and utilizing paired authorization codes which include a primary and a secondary code. The secondary code may be predetermined and permanently paired with the primary code, or it may be dynamically paired to the primary code and have an associated validity period after which it perishes. The secondary perishable authorization code's validity period can be limited in different ways, for example, to a pre-determined number of conferences (e.g., a single conference), an absolute time (i.e., for a limited time period, for example, from May 5th to May 10th), conference time, conference size (i.e., predetermined number of conferencees), and any combinations of the previous.

This conferencing service in which conferencing bridges are not booked in advance but rather are used only when and for the duration required, gives significant flexibility in how the LEC may bill for the service. In addition to the conventional conference services billing models, the system and its method allow to bill for the real port-time usage by end-users. That is, if a participant hasn't attended the whole conference, the port usage can be billed only for the duration it has been used.

A universal service is achieved in that end-users may be of any type, for example, residential or business, calling from any line or trunk type including but not limited to POTS, CLASS, Centrex, cellular or PCS, calling from a PBX or Key system, homing or not on a particular manufacturer's switching product. Also, the conferencing bridges may be shared with other switch-based conferencing services, for example, three-way calling.

BRIEF DESCRIPTION OF THE DRAWINGS

The invention will be better understood from the following description of a conferencing service together with reference to the accompanying drawing, in which.

DETAILED DESCRIPTION

The methodology, in accordance with the present invention, for providing a secure, on-demand meet-me conferencing service is premised on the utilization of a AIN infrastructure of a telecommunications network to centrally manage and allocate conference bridges distributed throughout network switches to calls originating anywhere in the network. The distributed conferencing facilities are now viewed by the whole network as a common pool of conferencing resources available for use to all network calls, originating and/or terminating anywhere therein, whereby the available resources within the pool are shared for more efficient use. A LEC can thereby provide additional conferencing services in terms of geographical diversity and thus serve a larger population without adding further conferencing facilities to service specific geographic regions and without any impediment to the current conferencing services.

Figure 1:
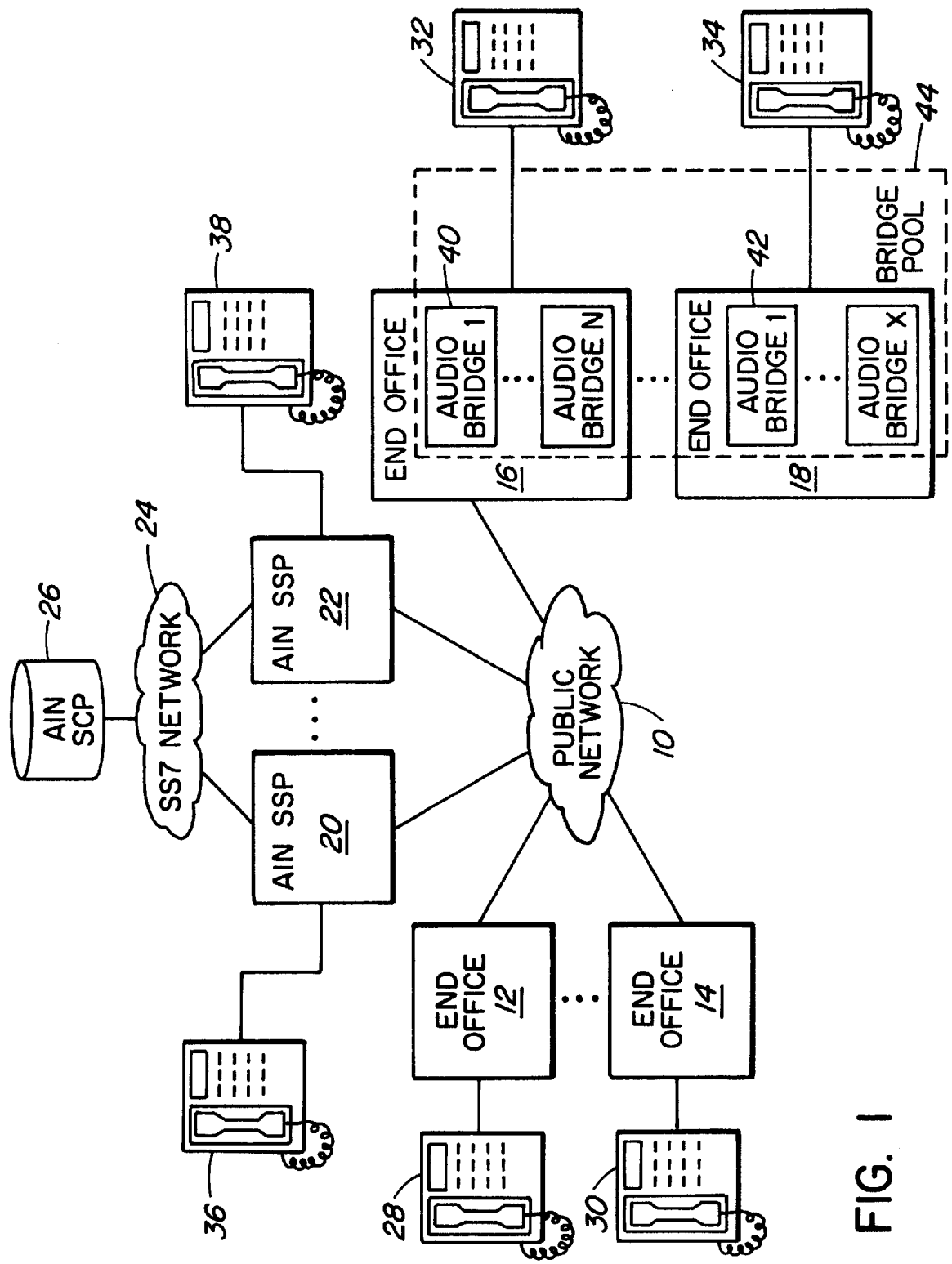
FIG. 1 is a block diagram representation of elements within a telephone network defining an embodiment for implementing the conferencing service.

Referring to FIG. 1, depicted to exemplify the conferencing service is a representation of a public switched telephone network (PSTN) 10 comprising various switching elements and network facilities which are shown exterior to the PSTN 10 simply for purposes of illustration. The switching elements consist of end offices 12, 14, 16 and 18, and AIN SSPs 20 and 22 which are communicatively coupled through a SS7 network 24 to an AIN SCP 26. Each switching element may have connected thereto a plurality of telephone sets which are represented in FIG. 1 by telephone sets 28, 30, 32 and 34 connected to end offices 12, 14, 16 and 18, respectively, and telephone sets 36 and 38 connected to AIN SSPs 20 and 22, respectively. The AIN SSPs 20 and 22 constitute switching elements equipped with the AIN call model while the end office 12, 14, 16 and 18 constitute switches which may not be equipped with such a model. The SS7 network 24 provides signaling links between the SSPs and between the SSPs and SCPs within the PSTN 10 which, of course, includes further facilities to link the various switching elements depicted.

End offices 16 and 18 are each equipped with a plurality of conferencing bridges 40 and 42, respectively, which together define a network pool 44 of bridge resources. The bridge pool 44 may be shared throughout the PSTN 10 and utilization thereof is not limited to users at telephone sets 32 and 34 which are directly connected to the offices 16 and 18. An end-user may originate a call from any switch and connect to the on-demand meet-me conferencing service. The AIN SCP 26 executes the method whereby this service is implemented. Moreover, it noted that the conferencing bridges of the bridge pool 22 may be provisioned in any of the switching elements within the PSTN 10, including AIN SSPs and that only end offices 16 and 18 are shown having conferencing bridges 40 and 42 for simplicity.

Figure 2:
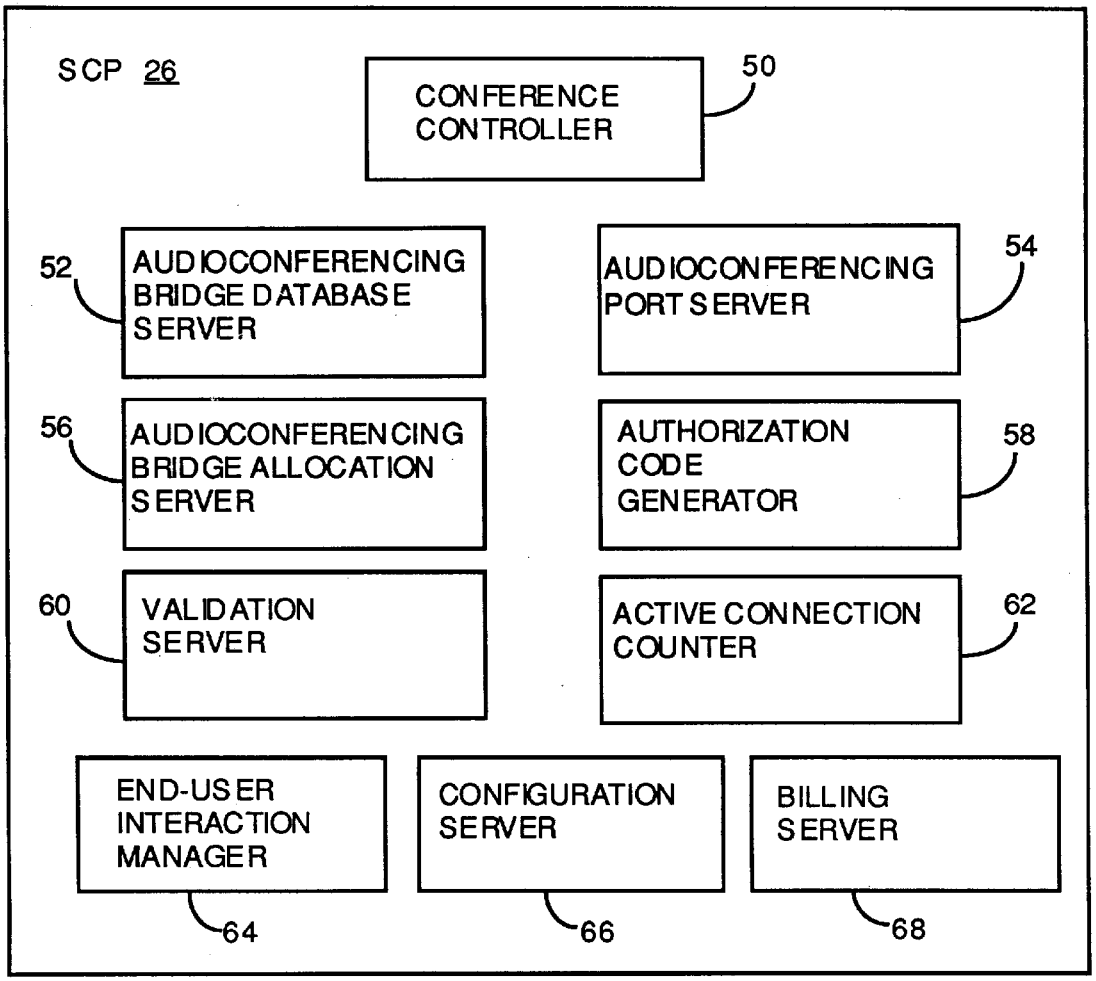
FIG. 2 is a block diagram representation of functions effected by a service control point in the telephone network.

The AIN infrastructure of the PSTN 10 provides a platform on which the telephony conference service is based and, specifically, the AIN SCP 26 which is programmed with the logic to implement the method for effecting the service. Functions introduced by the method and provided by the AIN SCP 26, as identified in FIG. 2, include a Conference Controller 50, Audioconferencing Bridge Database Server 52, Audioconferencing Port Server 54, Audioconferencing Bridge Allocation Server 56, Authorization Code Generator 58, Validation Server 60, Active Connection Counter 62, End-user Interaction Manager 64, Configuration Server 66 and Billing Server 68 processes.

The Conference Controller 50 is invoked by the SCP 26 upon recognizing calls from end-users are to the conferencing service and co-ordinates, for a given conference, the accesses to the other functions of this method.

The Audioconferencing Bridge Database Server 52 maintains routing and availability information in respect of the bridge pool 44. The routing information for each bridge 40, 42 may include a first DN (i.e., a chairperson meet-me conferencing DN or C-$DN_{mm}$) whereby a user constituting the chairperson controls initiation and subsequent termination of a conference at the corresponding bridge, and a second DN (i.e., a participant meet-me conferencing DN or P-$DN_{mm}$) whereby users may join an initiated conference at that bridge. Alternatively, each bridge may be associated with a single DN, whereby a conference is initiated at a particular bridge by the first call connected to the corresponding DN. The availability information may indicate status of the bridges 40, 42 within the bridge pool 44, for example, whether a particular bridge is in use or free. It receives its usage information from the Audioconferencing Bridge Allocation Server 56 and the Conference Controller 50.

The responsibility of the Audioconferencing Port Server 54 is to keep track of the port usage by the conferencing service, for each bridge in the pool 44 on a switch basis. This functionality can be enhanced to include an up-to-date network image of the port usage by the conferencing service and all the other services (e.g., 3-way call, centrex conferencing) in order to minimize, if not eliminate, the possibility of blockage at conference time. A blocking situation, for example, is when a chairperson can not establish a conference due to unavailability of bridges or circuits, or participants can't dial in a living conference for the same reason.

The Audioconferencing Bridge Allocation Server 56 implements the algorithm that, upon receiving a conference request from the Conference Controller 50, selects and allocates an available bridge from the list of free conferencing bridges which is obtained from the Audioconferencing Bridge Database Server 52. In doing this, it takes into account the port usage figures that it receives from the Audioconferencing Port Server 54.

The Authorization Code Generator 58 has the responsibility to generate the paired primary and secondary authorization codes by which the chairperson and the participants, respectively, may access a particular conference through this service. The primary authorization and the secondary authorization may be respective predetermined codes that are permanently paired. Alternatively, the predetermined primary code may be paired with a perishable secondary authorization code which has a predetermined validity limit. The Authorization Code Generator is responsible for maintaining all valid authorization code pairs.

The Validation Server 60 authorizes the various accesses to the service, for example, by validating an input primary code and an input secondary code received from calls by a chairperson and participants, respectively, of a conference. Furthermore, the Validation Server 60 may maintain subscription information for users having authorization to access the service. The subscription information may include predetermined identification codes for respective subscribers, each identification code being associated to the primary authorization code for the corresponding subscriber. Input subscriber identification received from calls to the conferencing service are validated against the maintained subscription information.

The Active Connection Counter 62 keeps track of the number of active connections in a conference.

The End-user Interaction Manager 64 implements the end-user interface. It manages the prompt and collect sessions through interaction with a service switching point within the AIN infrastructure, using conventional SS7 signaling and commands.

The Configuration Server 66 is an optional function that provides the Audioconferencing Bridge Allocation Server 56 with network topology information that can be used to allocate the bridges to optimize the use of network transmissions.

The Billing Server 68 stores all pertinent usage information on a conference basis. The times for initiation and termination of the conference by the chairperson may be recorded by the Billing Server 68 and, furthermore, the times at which each participant joins and leaves the conference may also be recorded. This information may be subsequently used by the LEC to perform the appropriate billing. For instance, the automatic number identification (ANI) or calling line identification (CLID) of the chairperson's call may be used for billing. Alternatively, the Chairperson may provide a calling card or credit card number.

Turning now to the operation of the conferencing service, with reference again to FIG. 1, the following describes a particular implementation of a method for effecting the service to which access is gained through subscription and paired authorization codes having a perishable secondary code. A typical sequencing of events is provided which illustrates how the method uses functionality existing within the elements of the PSTN 10 and particularly the AIN infrastructure. However, it should be understood that various sequencing combinations of the method steps can be envisioned and therefore, it is not a specific sequencing of events that constitutes this method but rather the use of the network elements' functionality to implement the service. Also, the description uses conventional terminology to refer to known functionality defined by Bellcore AIN 0.1.

Briefly, in the subscription-based approach, the conference chairperson shall subscribe to the service. At subscription time, the subscriber is provided with a primary authorization code, a code assignment DN and a conference DN. In addition, the subscriber may optionally be provided with an identification code. For improved security, the secondary authorization code is dynamically assigned on a conference basis. Prior to the conference, the subscriber calls the code assignment DN, provides his/her identification code, if any, and authorization code and "asks" for a secondary perishable authorization code which the subscriber will distribute to the required conference participants. The secondary perishable authorization code's validity period can be limited in different ways, including but not limited to the following: pre-determined number of conferences, absolute time, i.e., for a limited time period, conference time, conference size and any combinations of the previous. Prior to the conference, the subscriber distributes the secondary perishable authorization code to the required conference participants. At time of conference, the subscriber dials a conference DN and uses the primary authorization code, and, optionally, the identification code, to initiate the conference and therefor becomes the conference chairperson. The participants dial the conference DN and use the secondary perishable authorization code to access the conference. Only the participants with a valid secondary perishable authorization code are allowed access to the chairperson's conference. Depending on the service requirements, the code assignment DN and the conference DN could be the same or different. The code assignment and conference DNs need not be unique to this subscriber. The same code assignment and conference DNs may be shared by multiple, and even, all subscribers.

Prior To A Conference

1) Subscription

At time of subscription, the conferencing service provider, namely a LEC provides an end-user, for instance, at telephone set 28 (hereinafter referred to as end-user 28) with a primary authorization code together with the code assignment DN and the on-demand meet-me conferencing DN ($DN_{conf}$).

2) Obtain a perishable secondary authorization code End-user 28 dials the code assignment DN ($DN_{code}$).

3) End-office 12 Translates and Routes

End-office 12 translates the $DN_{code}$ and routes it, through the public network 10, to the switch that owns it, such as AIN SSP 20 in this example.

4) Triggering and Querying

In AIN SSP 20, an AIN SSP trigger is attached to $DN_{code}$. This trigger can either be of type 3/6/10-Digit Public Office Dialing Plan (PODP) or Termination_Attempt (TAT). When the call hits the trigger, the AIN call model verifies that the triggering criteria are met and then launches an AIN query to the SCP 26 through the SS7 network 24. If the trigger is of type PODP, an Info_Analyzed message is sent. If the trigger is of type TAT, a Termination_Attempt message is sent.

5) SCP 26 Analyzes the SSP Query

SCP 26 service logic initiates a prompt and collect session with the calling end-user. To do so, it sends a Send_To_Resource message to the AIN SSP 20 with the announcement ID and the number of digits to collect.

6) AIN SSP 20 prompts and collects service request from end-user 28:

Upon reception of the Send_To_Resource message, AIN SSP 20 establishes a voice path with end-user 28 and prompts end-user 28 for service selection. End-user 28, through telephone keypad, selects perishable secondary authorization code option. AIN SSP 20 collects end-user 28's digits and packages them in a Resource_Clear message that is sent to the SCP 26.

7) SCP 26 Analyzes the Collected Digits

SCP 26 service logic recognizes that end-user 28 has selected the perishable secondary authorization code option. Similar to steps 5 and 6, the SCP sends a Send_To_Resource message to the AIN SSP 20 with the announcement ID for primary authorization code and the number of digits to collect. AIN SSP 20 plays the announcement and then collects end-user 28's primary authorization code and packages them in a Resource_Clear message that is sent to SCP 26.

8) SCP 26 validates primary authorization code and assigns secondary authorization:

Upon reception of the Resource_Clear message, SCP 26 validates end-user 28's primary authorization code. If validation is successful, SCP 26 generates a unique perishable secondary authorization code which is uniquely paired with the permanent primary authorization code. SCP 26 then instructs AIN SSP 20 to play the authorization code to end-user 28. This is done by sending a Send_To_Resource message to AIN SSP 20.

9) AIN SSP 20 Plays the Authorization Code

Upon reception of the Send_To_Resource message, the AIN SSP 20 plays the authorization code to end-user 28. End-user 28 hangs up and the call is torn down.

10) End-user 28 Distributes Perishable Secondary Authorization Code

End-user 28 distributes the perishable secondary authorization code to all end-users expected to participate in the conference. For illustration, an end-user at telephone set 30 (hereinafter referred to as end-user 30) is assumed to be one of these participants.

At Time Of Conference

11) End-user 28 Initiates the Conference

To start the conference, end-user 28 dials the $DN_{conf}$.

12) Same as steps 3 to 5 but applied to $DN_{conf}$ in this context.

13) AIN SSP 20 Prompts and Collect Service Request From End-user 28

Upon reception of the Send_To_Resource message, AIN SSP 20 establishes a voice path with end-user 28 and prompts end-user 28 for service selection. End-user 28, through telephone keypad, provides the primary authorization code. AIN SSP 20 collects end-user 28's digits and packages them in a Resource_Clear message that is sent to the SCP 26.

14) SCP 26 Analyzes Collected Digits

SCP 26 service logic recognizes that end-user 28 has provided a primary authorization code which indicates that end-user 28 wants to initiate a conference and that he/she is the chairperson. The SCP 26 service logic then performs the following:

i) Validates the primary authorization code.

ii) From its internal list of all the conferencing bridges that are part of the common pool, the SCP 26 selects a free bridge. Each bridge is identified by a chairperson meet-me DN ($C-DN_{mm}$) and the corresponding participant meet-me DN ($P-DN_{mm}$). A chairperson meet-me DN is a DN that may give end-user control over conference initiation and termination. Whether the chairperson meet-me DN gives control or not over the initiation and termination is at the LEC and end-user choice. The SCP 26 allocates the selected $C-DN_{mm}$ to this conference. For this example, it is assumed that the $C-DN_{mm}$ corresponds to conferencing bridge 40 homing on end-office 16.

iii) Marks the selected $C-DN_{mm}$ as being in use.

iv) Updates its records on the number of conference ports in used on end-office 16.

v) Records conference call start time.

vi) Increases by 1 the active connections counter for this conference.

vii) Assigns a unique Echo_Data parameter to this conference connection.

viii) Instructs AIN SSP 20 to route the call to $C-DN_{mm}$. This is done by sending an Analyze_Route response to AIN SSP 20 if the original query was an Info_Analyze message or a Forward_Call response if the original query was a Termination_Attempt message. Together with the Analyze_Route or Forward_Call message, the SCP 26 sends a Send_Notification message containing the Echo_Data parameter. This instructs the AIN SSP 20 to notify the SCP 26 when the call terminates and to use the Echo_Data parameter call identifier.

15) AIN SSP 20 routes to C-DN$_{mm}$:

Upon reception of the Analyze_Route or Forward_Call message together with the Send_Notification message, the AIN SSP 20 routes the end-user 28's call to the C-DN$_{mm}$ through the public network 10 to end-office 16. In addition, it flags the call as requiring termination notification to the SCP 26.

16) End-office 16 Connects Call to Conferencing Bridge

Upon reception of call request to C-DN$_{mm}$, end-office 16 connects end-user 28 to a port of the conferencing bridge 40 to start a conference.

17) End-user 30 Dials in the Conference

In order to connect to the conference, end-user 30 dials the DN$_{conf}$.

18) Same as step 12, but applied to end-office 14 in this context.

19) AIN SSP 20 Prompts and Collects Service Request From End-user 30

Upon reception of the Send_To_Resource message, AIN SSP 20 establishes a voice path with end-user 30 and prompts end-user 30 for service selection. End-user 30, through telephone keypad, provides the perishable secondary authorization code. AIN SSP 20 collects end-user 30's digits and packages them in a Resource_Clear message that is sent to the SCP 26.

20) SCP 26 Analyzes the Collected Digits

SCP 26 service logic recognizes that end-user 30 has provided a perishable secondary authorization code which indicates that end-user 30 wants to dial in a living conference. The SCP 26 service logic then performs the following:

i) Validates the perishable secondary authorization code.

ii Correlates this secondary authorization code with the chairperson's primary authorization code. This is necessary to retrieve the conferencing bridge that has been allocated to this conference, i.e., C-DN$_{mm}$. From C-DN$_{mm}$, the SCP 26 retrieves the corresponding participant meet-me conference DN, i.e., P-DN$_{mm}$. Depending on the service scenario, that DN can either give only right to access a living conference initiated by C-DN$_{mm}$ or could also give right to initiate the conference in the case end-user 28 hasn't dialed in yet.

iii) Records conference call start time for this participant.

iv) Increases by 1 the active connections counter for this conference.

v) Updates its records on the number of conference ports in used on end-office 16.

vi) Assigns an Echo_Data parameter which is a unique call identifier.

vii) Instructs AIN SSP 20 to route the call to P-DN$_{mm}$. This is done by sending an Analyze_Route response to AIN SSP 20 if the original query was an Info_Analyze message or a Forward_Call response if the original query was a Termination_Attempt message. Together with the Analyze_Route or Forward_Call message, the SCP 26 sends a Send_Notification message containing the Echo_Data parameter. This instructs the AIN SSP 20 to notify the SCP 26 when the call terminates and use the Echo_Data parameter as the call identifier.

21) AIN SSP 20 Routes to P-DN$_{mm}$

Upon reception of the Analyze_Route or Forward_Call message together with the Send_Notification message, the AIN SSP 20 routes the end-user 30's call to the P-DN$_{mm}$ through the public network 10 to end-office 16. In addition, it flags the call as requiring termination notification to the SCP 26.

22) End-office 16 Connects Call to Conferencing Bridge

Upon reception of the call request to P-DN$_{mm}$, end-office 16 connects end-user 30 to the conference that has been initiated by C-DN$_{mm}$, using an available port on the bridge 40. End-user 28 and end-user 30 are now conferenced.

23) Other Participants Dialing In

Steps 17 to 22 are repeated for all conference participants, as long as the conference is active.

Conference Termination

24) End-user 30 Hangs Up

Responsive to end-user 30 hanging up:

i) The voice connection to conferencing bridge 40 is torn down.

ii) End-office 16 releases the conferencing bridge 40's conference port assigned to end-user 30 and makes it available for other conferences.

iii) The AIN SSP 20 detects call release and sends a Termination_Notification message to the SCP 26, the message including: the Echo_Data parameter assigned by SCP 26 to this call connection; the Termination_Indicator; and the Connect_Time for the call.

25) SCP 26 Receives the Termination_Notification Message From AIN SSP 20

Upon reception of the Termination_Notification message from AIN SSP 20, SCP 26 correlates the Echo_Data parameter with end-user 30's connection and then performs the following actions:

i) Records conference call stop time for this participant.

ii) Decreases by 1 the active connections counter for this conference.

iii) Updates its records on the number of conference ports in used on end-office 16.

26) Other Participants Hang Up

Steps 24 and 25 are repeated for all participants that hang up during an active conference.

27) End-user 28 Hangs Up

Responsive to end-user 28 hanging up:

i) The voice connection to conferencing bridge 40 is torn down.

ii) End-office 16 releases the conferencing bridge 40's conference port and makes it available for other conferences. It is noted, however, that whether or not the conference port can be made available for other conferences on a single-port basis or only on a group of port basis depends on the conferencing hardware and provisioning on the switch.

iii) If end-user 28 has been connected using a chairperson's DN (C-DN$_{mm}$) with conference termination control, end-office 16 terminates the conference and all active connections to the conference are torn down. If end-user 28 has been connected using a C-DN$_{mm}$ without conference termination control, end-office 16 doesn't terminate the conference. Consequently, the conference terminates when all parties have hung up.

iv) AIN SSP 20 detects call release and sends a Termination_Notification message to the SCP 26, the message being populated with: the Echo_Data parameter assigned by SCP 26 to this call connection; the Termination_Indicator; and the Connect_Time for the call.

28) SCP 26 receives the Termination_Notification message from AIN SSP 20:

Upon reception of the Termination_Notification message from AIN SSP 20, SCP 26 correlates the Echo_Data parameter with end-user 28, i.e., the chairperson's connection and then performs the following actions:

i) Records conference call stop time for the chairperson.

ii) Decreases by 1 the active connections counter for this conference.

iii) Updates its records on the number of conference ports in used on end-office 16.

iv) Updates its database with billing information.

v) Marks the C-DN$_{mm}$ as being available for another conference if end-user 28 has been connected using a C-DN$_{mm}$ with conference termination control. If end-user 28 has been connected using a C-DN$_{mm}$ without conference termination control, the C-DN$_{mm}$ is marked available for another conference only when all participants have hung up.

vi) Updates the validity of the perishable secondary authorization code paired with the primary authorization code associated with this chairperson. For instance, the secondary code may be valid for a single conference and consequently its paired association with the chairperson's primary authorization code now perishes.

Hence, the termination of the conference is complete.

As a variant to the above described subscription-based access method which utilizes a perishable secondary authorization code, the meet-me conferencing service may simply allow access upon the basis of permanent primary and secondary authorization codes. In this approach, the conference chairperson shall subscribe to the service. At subscription time, the subscriber is provided with two authorization codes, a primary and a secondary one which are uniquely paired and with a conference DN. The conference DN needs not be unique to this subscriber. The same conference DN may be shared by multiple, and even, all subscribers. In addition, the subscriber may optionally be provided with an identification code. At time of conference, the subscriber dials a conference DN and uses the primary authorization code to initiate the conference and therefor becomes the conference chairperson. The participants dial the conference DN and use the secondary authorization code to access the conference. Only the participants with a valid secondary authorization code are allowed access to the chairperson's conference.

Operation of the meet-me conferencing service utilizing the permanent authorization code approach to access the service, prior to a conference, involves the following steps:

1) Subscription

At time of subscription, the conferencing service provider, namely the LEC provides an end-user, for example, at telephone set 28 (hereinafter referred to as end-user 28) with two authorization codes, a primary and a secondary one and the on-demand meet-me conferencing DN (DN$_{conf}$). The DN$_{conf}$ may not be specific only to end-user 28.

2) End-user 28 Distributes Secondary Authorization Code

End-user 28 distributes the secondary authorization code to all end-users expected to participate in the conference. For illustration, an end-user at telephone set 30 (hereinafter referred to as end-user 30) is assumed to be one of these participants.

Subsequent operational steps effected at time of the conference and in termination of the conference are substantially similar to those described above in relation to the perishable secondary authorization code approach, except that updating the validity of the secondary authorization code is not necessary in this case. In addition, the service control point will not allow a participant to initiate a conference without the chairperson. The primary authorization code must be received from a first call, to which a conference bridge is allocated and subsequent calls presenting the secondary authorization code are joined to that bridge. If the secondary code is received prior to allocating a bridge to its paired primary authorization code, a conference is not initiated.

Those skilled in the art will recognize that various modifications and changes could be made to the invention without departing from the spirit and scope thereof. For instance, a specific embodiment of an audio conferencing service has been described, but the invention may be adapted to a combined audio/video conferencing service. It should therefore be understood that the claims are not to be considered as being limited to the precise embodiments of the conferencing service set forth above, in the absence of specific limitations directed to each embodiment.

We claim:

1. In a telecommunications network including a plurality of switching systems, one or more of which having one or more conference bridges, a method of accessing a conferencing service to effect a conference, comprising the steps of:

maintaining subscription information including predetermined primary authorization codes associated with respective subscribers;

receiving, from a first call, an input subscriber identification;

providing, responsive to correlating the input subscriber identification to a particular subscriber identified from the maintained subscription information, a secondary authorization code to the first call;

maintaining an association pairing the primary authorization code of the particular subscriber with the secondary authorization code;

receiving, from a second call, an input primary code;

selecting an available bridge from the one or more bridges;

maintaining, responsive to correlating the input primary code to the primary authorization code of the particular subscriber, an association between the selected bridge and the particular subscriber;

connecting the second call through the network to the selected bridge whereby the second call initiates a conference;

receiving, from a third call, an input secondary code; and connecting, responsive to correlating the input secondary code to the secondary authorization code paired with the primary authorization code of the particular subscriber, the third call through the network to the selected bridge whereby the third call joins the initiated conference.

2. A method as claimed in claim 1, wherein the step of selecting the available bridge includes:

maintaining availability information with respect to the one or more bridges;

selecting a particular bridge which the availability information indicates is available; and updating the availability information associated with the particular bridge to indicate that the particular bridge is not available.

3. A method as claimed in claim 2, wherein the input subscriber identification is the primary authorization code of the particular subscriber.

4. A method as claimed in claim 2, wherein the input subscriber identification includes a predetermined identification code.

5. A method as claimed in claim 4, wherein the input subscriber identification includes the primary authorization code of the particular subscriber.

6. A method as claimed in claim 2, wherein the third call includes a plurality of calls initiated by respective participants.

7. A method as claimed in claim 2, wherein the telecommunications network includes an intelligent network having a service control point (SCP) and one or more service switching points (SSPs).

8. A method as claimed in claim 7, wherein the step of connecting the second call to the selected bridge includes the SCP instructing one of the SSPs, which triggers in processing of the second call, to route the second call to a first directory number which provides call connections thereto with control over conference initiation at the selected bridge.

9. A method as claimed in claim 8, wherein the step of connecting the third call to the selected bridge includes the SCP instructing one of the SSPs, which triggers in processing of the third call, to route the third call to a second directory number which enables call connections thereto to join initiated conferences at the selected bridge.

10. A method as claimed in claim 9, wherein the first directory number and the second directory number are the same.

11. A method as claimed in claim 1, wherein the secondary authorization code has a validity limit.

12. A method as claimed in claim 11, wherein the validity limit includes a predetermined number of conferences.

13. A method as claimed in claim 12, wherein the secondary authorization code is valid for a single conference.

14. A method as claimed in claim 11, wherein the validity limit includes a predetermined conference size.

15. A method as claimed in claim 11, wherein the validity limit is an absolute time period.

16. A method as claimed in claim 1, wherein the secondary authorization code is permanently paired with the primary authorization code, and the second call from which the primary authorization code is received occurs prior to the third call from which the secondary authorization code is received.

17. In a telecommunications network including a plurality of switching systems, one or more of which having one or more conference bridges, a system for effecting a conferencing service, comprising:

means for maintaining subscription information including predetermined primary authorization codes associated with respective subscribers;

means for receiving, from a first call, an input subscriber identification;

means for providing, responsive to correlating the input subscriber identification to a particular subscriber identified from the maintained subscription information, a secondary authorization code to the first call;

means for maintaining an association pairing the primary authorization code of the particular subscriber with the secondary authorization code;

means for receiving, from a second call, an input primary code;

means for selecting an available bridge from the one or more bridges;

means for maintaining, responsive to correlating the input primary code to the primary authorization of the particular subscriber, an association between the selected bridge and the particular subscriber;

means for connecting the second call through the network to the selected bridge whereby the second call initiates a conference;

means for receiving, from a third call, an input secondary code; and means for connecting, responsive to correlating the input secondary code to the secondary authorization code paired with the primary authorization code of the particular subscriber, the third call through the network to the selected bridge whereby the third call joins the initiated conference.

18. A system as claimed in claim 17, wherein the means for selecting the available bridge includes:

means for maintaining availability information with respect to the one or more bridges;

means for selecting a particular bridge which the availability information indicates is available; and means for updating the availability information associated with the particular bridge to indicate that the particular bridge is not available.

19. A system as claimed in claim 18, wherein the input subscriber identification is the primary authorization code of the particular subscriber.

20. A system as claimed in claim 18, wherein the input subscriber identification includes a predetermined identification code.

21. A system as claimed in claim 20, wherein the input subscriber identification includes the primary authorization code of the particular subscriber.

22. A system as claimed in claim 18, wherein the third call includes a plurality of calls initiated by respective participants.

23. A system as claimed in claim 18, wherein the telecommunications network includes an intelligent network having a service control point (SCP) and one or more service switching points (SSPs).

24. A system as claimed in claim 23, wherein the means for connecting the second call to the selected bridge includes means for instructing by the SCP one of the SSPs, which triggers in processing of the second call, to route the second call to a first directory number which provides call connections thereto with control over conference initiation at the selected bridge.

25. A system as claimed in claim 24, wherein the means for connecting the third call to the selected bridge includes means for instructing by the SCP one of the SSPS, which triggers in processing of the third call, to route the third call to a second directory number which enables call connections thereto to join initiated conferences at the selected bridge.

26. A system as claimed in claim 25, wherein the first directory number and the second directory number are the same.

27. A system as claimed in claim 17, wherein the secondary authorization code has a validity limit.

28. A system as claimed in claim 27, wherein the validity limit includes a predetermined number of conferences.

29. A system as claimed in claim 28, wherein the secondary authorization code is valid for a single conference.

30. A system as claimed in claim 27, wherein the validity limit includes a predetermined conference size.

31. A system as claimed in claim 27, wherein the validity limit is an absolute time period.

32. A system as claimed in claim 17, wherein the secondary authorization code is permanently paired with the primary authorization code, and the second call from which the primary authorization code is received occurs prior to the third call from which the secondary authorization code is received.

* * * * *